(12) United States Patent
Satish et al.

(10) Patent No.: US 7,970,939 B1
(45) Date of Patent: Jun. 28, 2011

(54) METHODS AND SYSTEMS FOR ADDRESSING DNS REBINDING

(75) Inventors: Sourabh Satish, Fremont, CA (US); Basil Gabriel, Downey, CA (US)

(73) Assignee: Symantec Corporation, Mountain View, CA (US)

( * ) Notice: Subject to any disclaimer, the term of this patent is extended or adjusted under 35 U.S.C. 154(b) by 569 days.

(21) Appl. No.: 11/967,954

(22) Filed: Dec. 31, 2007

(51) Int. Cl.
G06F 15/16 (2006.01)
(52) U.S. Cl. .......................... 709/245; 709/224; 713/170
(58) Field of Classification Search .................. 709/245, 709/224
See application file for complete search history.

(56) References Cited

U.S. PATENT DOCUMENTS

| | | | |
|---|---|---|---|
| 6,339,423 B1 * | 1/2002 | Sampson et al. | 715/854 |
| 6,907,525 B2 * | 6/2005 | Pazi et al. | 713/170 |
| 6,961,783 B1 * | 11/2005 | Cook et al. | 709/245 |
| 7,472,418 B1 * | 12/2008 | McCorkendale et al. | 726/24 |
| 7,620,733 B1 * | 11/2009 | Tzakikario et al. | 709/245 |
| 2008/0313648 A1 * | 12/2008 | Wang et al. | 719/315 |

FOREIGN PATENT DOCUMENTS
WO WO 2007/107634 9/2007

OTHER PUBLICATIONS

Search Report and Written Opinion in related International Application No. PCT/US2008/086826.
Jackson et al., "Protecting Browsers from DNS Rebinding Attacks," CCS'07, Oct. 29, 2007, Alexandria, VA.
"BHO," Wikipedia, http://wikipedia.org/.

* cited by examiner

Primary Examiner — Yves Dalencourt
(74) Attorney, Agent, or Firm — Advantedge Law Group

(57) ABSTRACT

A computer-implemented method comprising detecting a resolution of an internet address to a first computing-device address, the internet address being associated with a first domain. The method may also comprise storing a domain-name record, the domain-name record associating the internet address with the first computing-device address. The method may comprise using the domain-name record to bind the first domain to the first computing-device address and preventing, until a request to leave the first domain is detected, the first domain from being rebound to a second computing-device address. Systems and computer-readable media for addressing DNS rebinding are also disclosed.

16 Claims, 8 Drawing Sheets

METHODS AND SYSTEMS FOR ADDRESSING DNS REBINDING

BACKGROUND

Computer attackers may use many techniques to gain access to secure computing systems. One method used by hackers is known as domain-name rebinding. In a domain-name rebinding attack, an attacker may subvert the same-origin policy implemented by a browser in order to gain access to sensitive information and secured servers.

Domain-name rebinding attacks may be relatively simple to implement. The attacker may register a domain delegated to a Domain Name System (DNS) server controlled by the attacker. The attacker may configure the DNS server to respond to DNS queries with relatively short Time To Live (TTL) values. In response to a first DNS query, the DNS server may provide an Internet Protocol (IP) address to a malicious server. The browser may send a second DNS query to refresh the cache after the cache entry (which may have a short time to live) expires. In response to the second request, the DNS server may provide an IP address of a secure system that the attacker desires to access.

One example of how DNS rebinding may be implemented is in the context of a web page with multiple frames. First, an attacker may attract a user to direct a browser to the attacker's domain. The attacker may use advertisements, e-mails, or various other tactics to draw the user to the attacker's domain. The attacker's DNS server may respond to a first DNS query with an IP address of a server controlled by the attacker. After a cached record containing the first IP address expires, the browser may send a second DNS query to the attacker's DNS server, and the DNS server may respond to the second DNS query with an IP address of a legitimate server, such as a bank's server.

As a result of the DNS rebinding, a first frame in the web page may originate from the attacker's server, and a second frame may originate from the bank's server. The frame originating from the attacker's server may be hidden from the user, such that the user only sees the frame originating from the bank. The bank's actual website may be rendered on the browser such that the user may have no reason to doubt that the page is sent from the bank. In fact, site key technology of the bank might even be deployed and work through the browser. The browser may not recognize that the malicious frame and bank's frame originate from different sources. Thus, the attacker may have subverted the same-origin policy of the browser. The attacker's frame may monitor the bank's frame for user keystroke events and may obtain other sensitive information from the bank's website.

One technique that attempts to prevent DNS rebinding attacks is known as DNS pinning. In DNS pinning, a browser may be programmed to ignore the TTL value provided in response to DNS queries. The TTL value may be overridden by a longer TTL value (e.g., a ten minute TTL value). In some situations, the longer TTL value may keep the browser from sending a second DNS query and may therefore be able to keep attackers from performing DNS rebinding.

Attackers have found ways to work around DNS pinning technologies. For example, an attacker's web page may make a request to a non-existing port of the attacker's domain. In this situation, the browser may attempt to refresh its DNS cache by sending out another DNS query. This may allow the attacker to perform DNS rebinding and refresh the DNS cache with an IP address from a different server (override the IP address of the attacker's server with a trusted domain IP address). What is needed, therefore, is more robust protection against DNS rebinding attacks.

SUMMARY

Embodiments of the present disclosure may address various disadvantages and problems associated with prior attempts to prevent DNS rebinding attacks, and may also provide various other advantages and features. For example, some embodiments may prevent, until a request to leave (e.g., navigate away from) a first domain is detected, the first domain from being rebound. Such a method may include detecting a resolution of an internet address (e.g., a uniform resource locator or uniform resource identifier) to a first computing-device address (e.g., an internet-protocol address). The internet address may be associated with a first domain. The method may also comprise storing a domain-name record. The domain-name record may associate the internet address with the first computing-device address. The first domain-name record may be stored by caching the domain-name record at a browser level and/or at an operating system level. The method may comprise using the domain-name record to bind the first domain to the first computing-device address. Then, as previously mentioned, the method may comprise preventing, until a request to leave the first domain is detected, the first domain from being rebound to a second computing-device address.

According to some embodiments, using the domain-name record to bind the first domain to the first computing-device address may comprise providing the domain-name record in response to a subsequent domain-name-service query for the first domain. Preventing the first domain from being rebound may also comprise prohibiting, until the request to navigate away from the first domain is detected, modification of the domain-name record. In such embodiments, the method may comprise receiving a request to access a non-existing port on the first domain. The method may also comprise preventing the domain-name record from being modified in response to the request to access the non-existing port. In at least one embodiment, the method may operate by hooking a domain-name-system (DNS) query application-programming interface (API).

In some embodiments, a system may comprise a browser plug-in for a network browser. The browser plug-in may comprise a detection module configured to detect a resolution of an internet address to a first computing-device address. The internet address may be associated with a first domain. The browser plug-in may also comprise a domain-name record cache configured to store a domain-name record. The domain-name record may associate the internet address with the first computing-device address. The browser plug-in may also comprise a domain-name-system response module configured to use the domain-name record to bind the first domain to the first computing-device address by providing the domain-name record in response to a domain-name-service query for the first domain. The browser plug-in may further comprise a security module configured to prevent, until the browser navigates away from or otherwise leaves the first domain, the first domain from being rebound to a second computing-device address. In some embodiments, the detection module and the domain-name record cache may be part of a domain-name system proxy installed at a kernel level. In other embodiments, the domain-name-system response module and the security module may also be part of the domain-name-system proxy installed at the kernel level.

As discussed, embodiments of the instant disclosure provide various methods and systems for dealing with DNS rebinding attacks. Various embodiments may provide a browser plug-in for dealing with DNS rebinding attacks. Other embodiments may comprise a kernel-level DNS proxy, and at least one embodiment combines a kernel-level DNS proxy and browser plug-in approach to address DNS rebinding.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
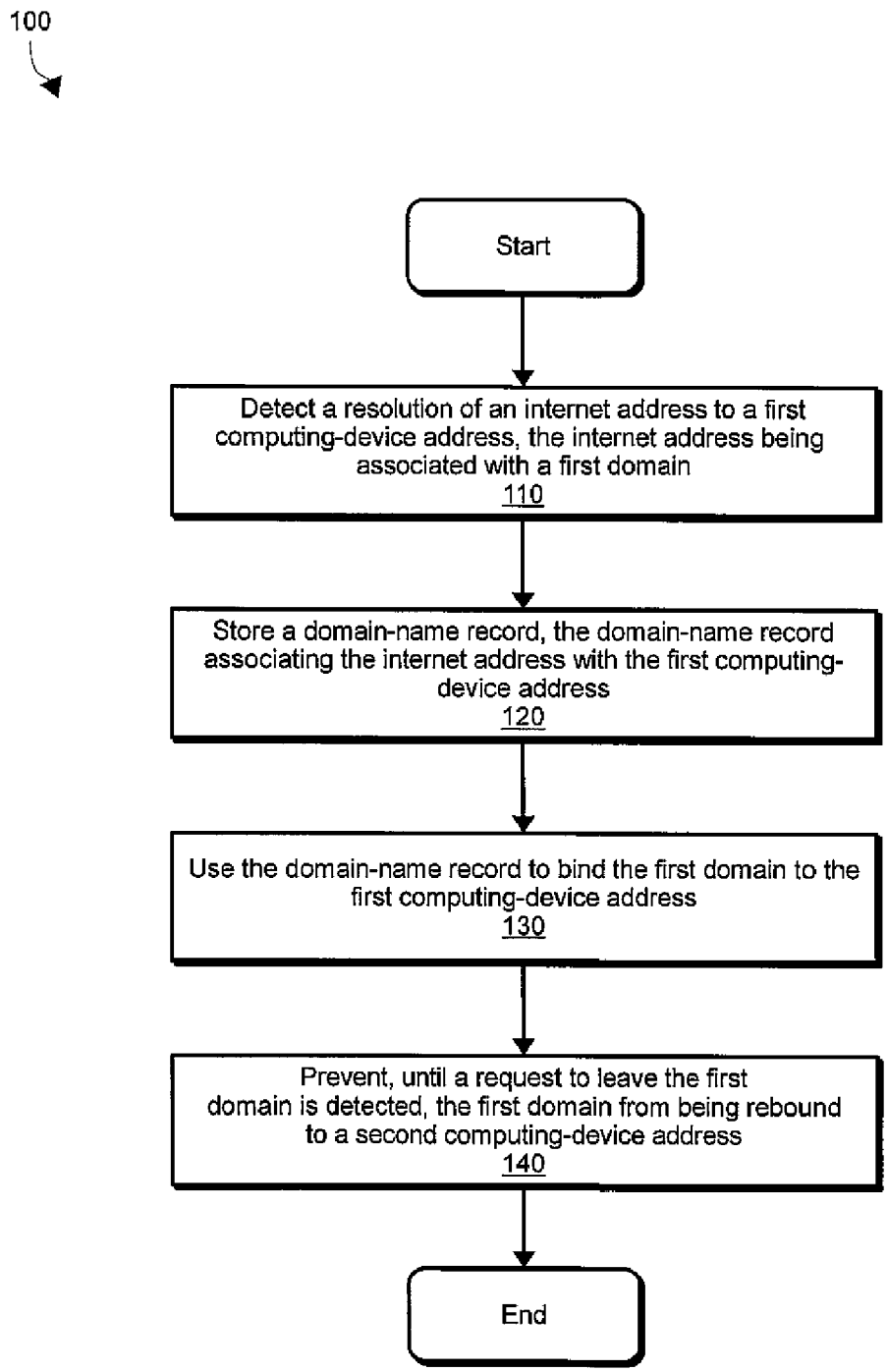
FIG. 1 is a block diagram of an exemplary method for addressing DNS rebinding according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The following is intended to provide a detailed description of various embodiments and should not be taken to be limiting in any way. Various exemplary methods and systems for addressing DNS rebinding are described and/or illustrated herein. For example, the instant disclosure presents methods and systems for preventing, until a browser leaves a first domain, a web page from being rebound to a second computing-device address. Such methods and systems may be implemented in a browser plug-in, a kernel-level proxy, through some combination of browser-level and kernel-level modules, or through any other suitable approach. Various other implementations also fall within the scope of the instant disclosure. As discussed in greater detail below, embodiments of the instant disclosure may provide more robust and effective security.

FIG. 1 shows an exemplary method 100 for addressing DNS rebinding attacks. As discussed in FIGS. 2-4, the method illustrated in FIG. 1 may be implemented by various types of software modules and other devices in various ways. For example, a security module may be loaded into a browser or installed on an operating system. The security module may detect a resolution of an internet address (e.g., Uniform Resource Identifier (URI), Uniform Resource Locator (URL), or any other suitable identifier) to a first computing-device address (step 110). The first computing-device address may comprise an Internet Protocol (IP) address. In some embodiments, the security module may perform the DNS resolution, and detecting the resolution of the internet address may comprise receiving a response from a DNS server. In other embodiments, the security module may detect a resolution of an internet address to a first computing-device address by detecting that a browser has received a response to a DNS query.

The internet address may be associated with a first domain. An internet address may be any identifier of a domain and may be associated with a top-level domain, a second-level domain, and/or various other sub-domains. A top level domain may be a domain such as a ".com" domain, a ".net" domain, a ".gov" domain, etc. A second-level domain may be the domain that immediately precedes the top-level domain. For example, for the internet address "second_level.com", the term "second_level" may represent a second-level domain. In some embodiments, the first domain may be a second-level domain. The first domain may also be associated with any other suitable domain, domain level, or domain sub-level.

When the internet address is resolved to the first computing-device address, the security module (or the browser) may create a domain-name record. The security module may store the domain-name record (step 120). The security module may store the domain-name record in a cache or in any other suitable data-storage mechanism or device. The domain-name record may associate the first domain with the first computing-device address. In some embodiments, associating the internet address with the first computing-device address may be referred to as binding the first domain to the first computing-device address.

The security module may use the domain-name record to bind the first domain to the first computing-device address (step 130). A domain-name record may bind the computing-device address to the first domain when the domain-name record is used to respond to DNS queries for the first domain. In order to protect against a malicious attack, the security module may prevent, until a request to navigate away from the first domain is detected, the first domain from being rebound to a second computing-device address (step 140).

The security module may detect that the browser is navigating away from the first domain by observing a "navigate_begin" event or any other event or action that indicates that a user may be directing the browser page (or a browser tab in tabbed-browsing embodiments) to another domain. As previously mentioned, the first domain may refer to a second-level domain and all sublevel domains within the second-level domain. Thus, a user may navigate within the first domain and/or any sub-domains without the cache that stores the domain-name record ever being refreshed or updated. In some embodiments, the security module may prevent DNS rebinding attacks by updating the cache only when the user navigates away from the first domain. In at least one embodiment, the security module may notify a proxy when a browser leaves the first domain so that the proxy can invalidate or otherwise clear its cache and prepare for a new browsing event to a new domain. A browser may leave a first domain when the browser is directed to a new domain, when the browser window is closed, or when a tab in the browser is closed.

Figure 2:
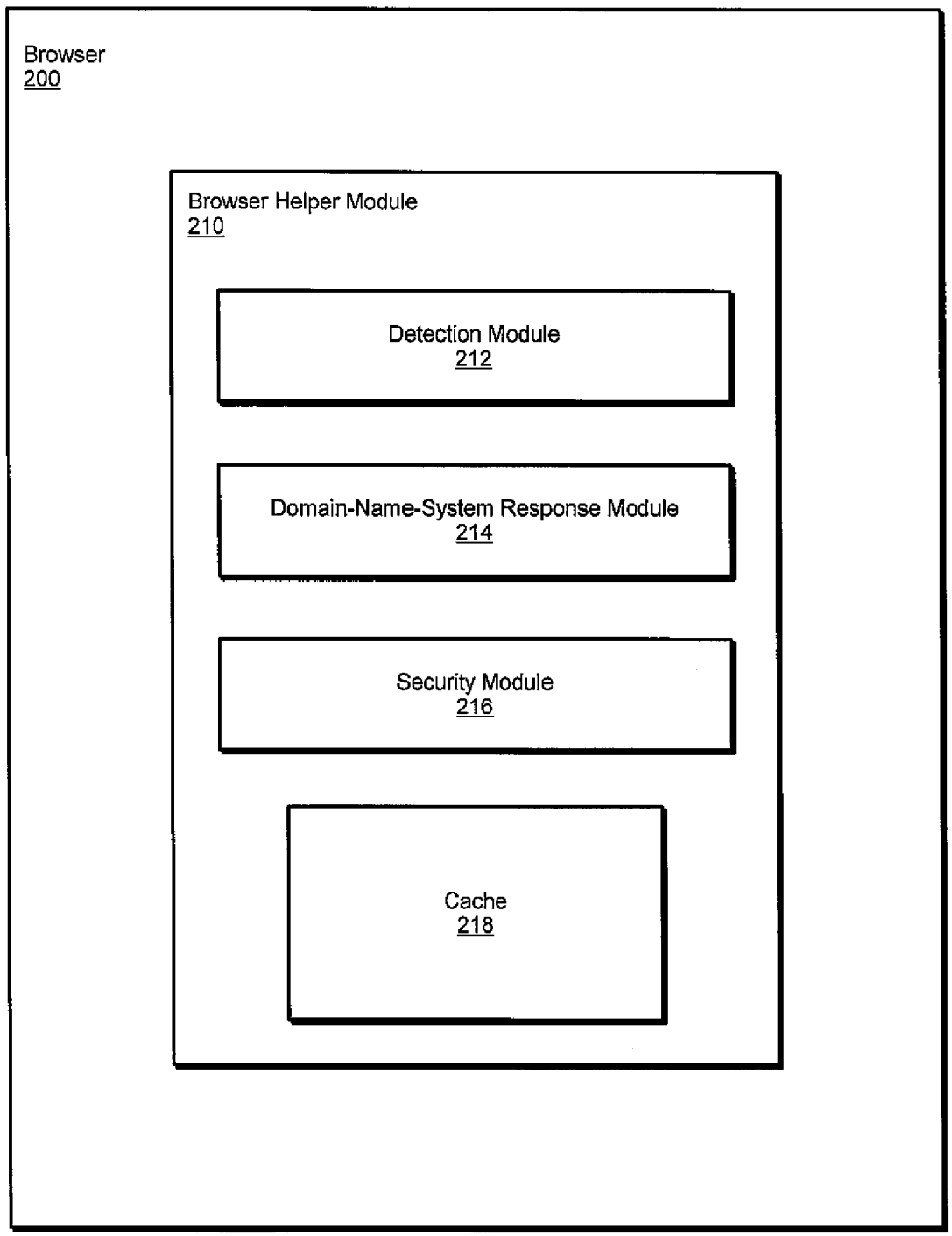
FIG. 2 is a block diagram of an exemplary browser with a browser-helper module installed to address DNS rebinding according to certain embodiments.

FIG. 2 shows a browser 200 according to embodiments of the present disclosure. Browser 200 may be any type of software that allows a browser to browse a network such as the internet. A browser may be a software application capable of browsing a network, such as INTERNET EXPLORER, FIREFOX, SAFARI, OPERA, or any other suitable browsing application. According to some embodiments, the security module may be implemented as a dynamic-link-library module that is loaded into the browser. The security module may be a Browser Helper Object (BHO), such as browser helper module 210 in FIG. 2. Browser helper module 210 may be loaded into the browser at any point in time. In some embodiments, a browser may be preconfigured with browser helper module 210. In other embodiments, browser helper module 210 may be a plug-in that may be loaded into a browser.

Browser helper module 210 may include a detection module 212, a domain-name-system response module 214, a security module 216, and a cache 218. Detection module 212 may be configured to detect a resolution of an internet address to a first computing-device address. In some embodiments, detection module 212 may also control whether a DNS query is sent to a DNS server or responded to with data in cache 218. The internet address may be associated with a first domain. Detection module 212 may detect resolution of an internet address to a first computing-device address when a user directs a browser to navigate to the first domain. After detecting the resolution of the internet address to the first computing-device address, browser helper module 210 may store a domain-name record in cache 218. The domain-name record may associate the internet address with the first computing-device address.

Domain-name-system response module 214 may be configured to use the domain-name record to bind the first domain to the first computing-device address by providing the domain-name record in response to a domain-name-service query for the first domain. Security module 216 may be configured to prevent, until a request to navigate away from the first domain is detected, the first domain from being rebound to a second computing-device address. For example, security module 216 may detect whether a browser is navigating to a new domain and prevent cache 218 from being updated until it detects that the browser is navigating to a new domain. In various embodiments, domain-name-system response module and security module 216 may be the same module and/or may provide similar functionality.

FIG. 2 represents an example of a security module that is loaded into a browser. While FIG. 2 shows various different modules, these modules may all be combined as part of a single module or may be separate sets of code within a single module. For example, detection module 212, domain-name-system response module 214, and security module 216 may be part of one or more applications that may comprise a browser plug-in or may be integrated into a browser in any other suitable manner.

Providing DNS rebinding security in a browser plug-in may have many advantages. For example, since the plug-in is loaded in and may be specific to the process (e.g., the browser) to be protected, a system may not need to use resources for determining whether to use protection for a particular process. In other words, only the process to be protected may be impacted by the plug-in. In contrast, if a DNS proxy is installed at the kernel level, it may affect some processes that are not to be protected. Another advantage of providing a browser plug-in may be that the plug-in may better evaluate a security context (e.g., the plug-in may be able to determine what type of page is being displayed, what field are being displayed, etc.) and may be able to react more efficiently and quickly to security issues.

Figure 3:
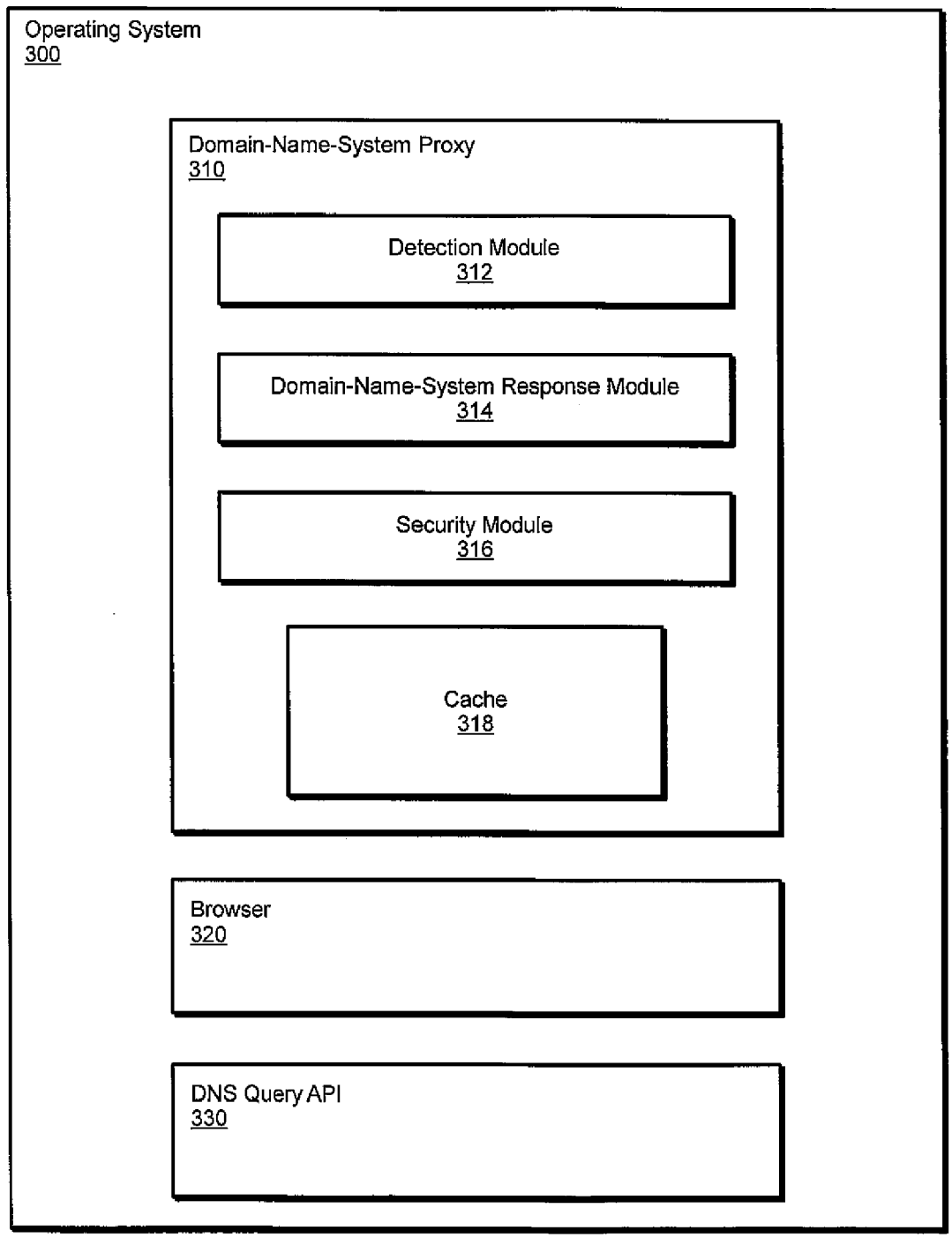
FIG. 3 is a block diagram of an exemplary system for addressing DNS rebinding according to certain embodiments.

FIG. 3 illustrates an operating system 300. Operating system 300 may be any suitable operating system such as WINDOWS, MAC OS X, UNIX, LINUX and/or any other operating system capable of running a network browser. Implementation of embodiments of the present disclosure may vary among operating systems. As shown, operating system 300 may comprise a domain-name-system proxy 310, a browser 320, and a DNS Query API 330. Domain-name-system proxy 310 may include a detection module 312, a domain-name-system response module 314, a security module 316, and a cache 318. In contrast to the embodiment shown in FIG. 2, each of modules 312, 314, 316, and cache 318 may be implemented as a DNS proxy at a kernel or operating system level rather than being loaded into a browser.

Detection module 312, like detection module 212, may detect resolution of an internet address to a first computing-device address when a user directs a browser to navigate to the first domain. After detecting the resolution of the internet address to the first computing-device address, a domain-name record may be stored in cache 318. Domain-name-system response module 314 may be configured to use the domain-name record to bind the first domain to the first computing-device address by providing the domain-name record in response to a domain-name-service query for the first domain. Security module 316 may be configured to prevent, until a request to navigate away from the first domain is detected, the first domain from being rebound to a second computing-device address. Security module 316 may also be configured to communicate with a browser helper object (or other browser component) to determine when a user is navigating away from the first domain. In other words, a browser-helper object may tell security module 316 when a user leaves the first domain.

DNS Query API (Application Programming Interface) 330 may be a DNS query application programming interface, such as a WINDOWS API. Domain-name-system proxy 310 may hook the DNS Query API and may replace the functionality of the DNS Query API in order to monitor DNS queries and resolutions of the queries into a cache. As shown, the embodiment in FIG. 3 may use a cache in the domain-name-system proxy (cache 318) instead of a cache implemented through the DNS Query API to store domain-name records. Providing control of the cache through the domain-name-system proxy may allow the cache to be controlled in a manner that protects the cache against DNS rebinding attacks.

Figure 4:
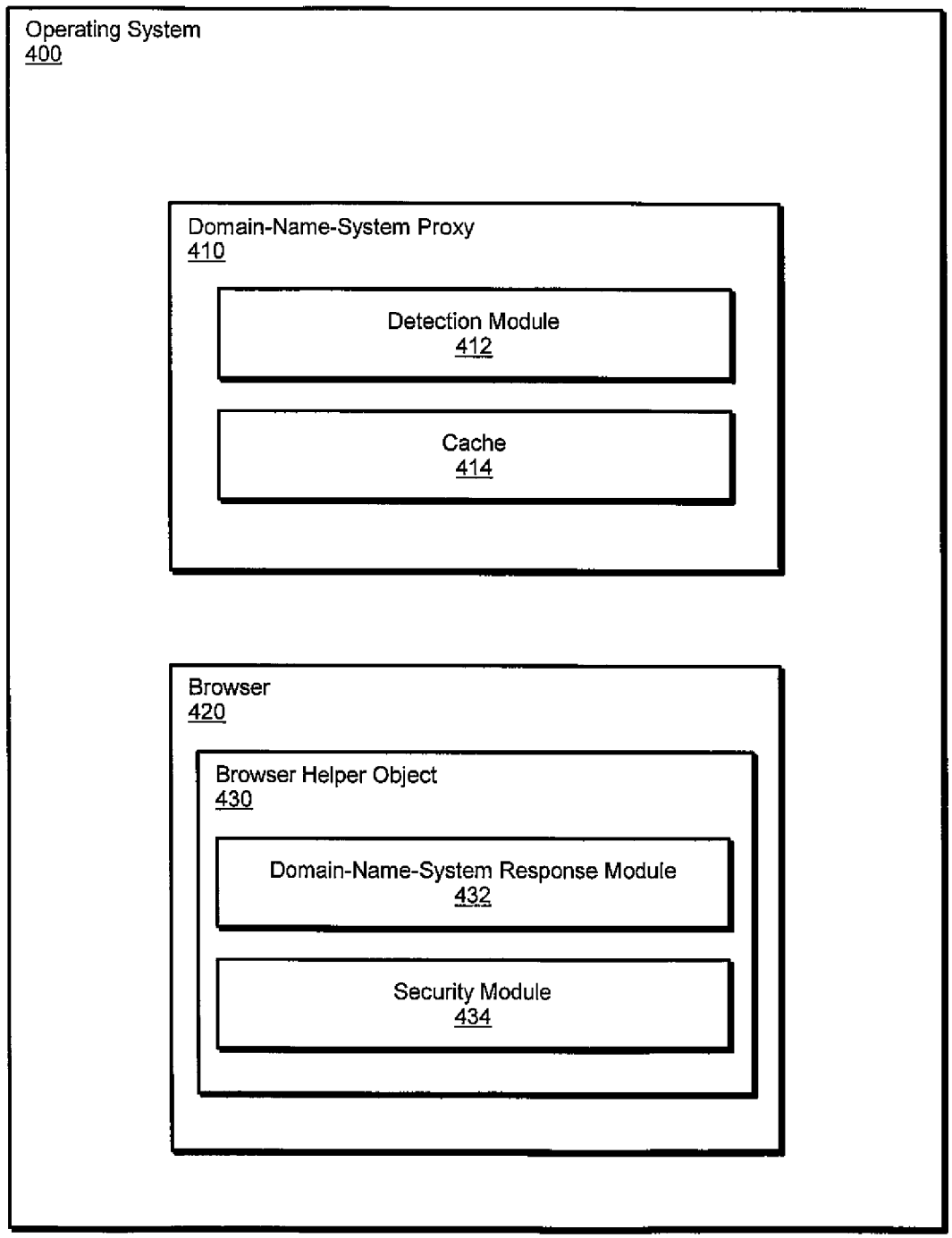
FIG. 4 is another block diagram of an exemplary system for addressing DNS rebinding according to certain embodiments.

FIG. 4 shows an operating system 400 with a domain-name-system proxy 410 and a browser 420. As shown in FIG. 400, functionality of the security method may be divided between domain-name-system proxy 410 and browser 420. For example, domain-name-system proxy 410 may include detection module 412 and cache 414 while browser helper object 430 may include domain-name-system response module 432 and security module 434. In at least one embodiment, browser helper object 430 may be configured to communicate with domain-name-system proxy 410.

Detection module 412 may detect resolution of an internet address to a first computing-device address when a user directs a browser to navigate to the first domain. After detecting the resolution of the internet address to the first computing-device address, a domain-name record may be stored in cache 414. Domain-name-system response module 432 may be configured to use the domain-name record to bind the first domain to the first computing-device address by providing the domain-name record in response to a domain-name-service query for the first domain. Security module 434 may be configured to prevent, until a request to navigate away from the first domain is detected, the first domain from being rebound to a second computing-device address.

Including part or all of the DNS proxy at a kernel level, as shown in FIGS. 3 and 4, may provide advantages. For example, providing the DNS cache outside the browser may protect the cache from potential tampering by an attacker. In some embodiments, providing the security functionality of a detection module, a domain-name-system response module, a security module, and a cache at the kernel level may provide the most robust protection against potential attackers. In such embodiments, DNS rebinding protection may be implemented outside the browser and may therefore be more difficult for an attacker to manipulate.

The DNS security systems disclosed herein may be implemented along with other types of security. For example, the browser and/or underlying operating system may further strengthen the DNS resolution process via reverse lookups, white lists, black lists, or other security protecting mechanisms. These additional security measures may prohibit access to malicious websites and provide additional security robustness for the browser.

Figure 5:
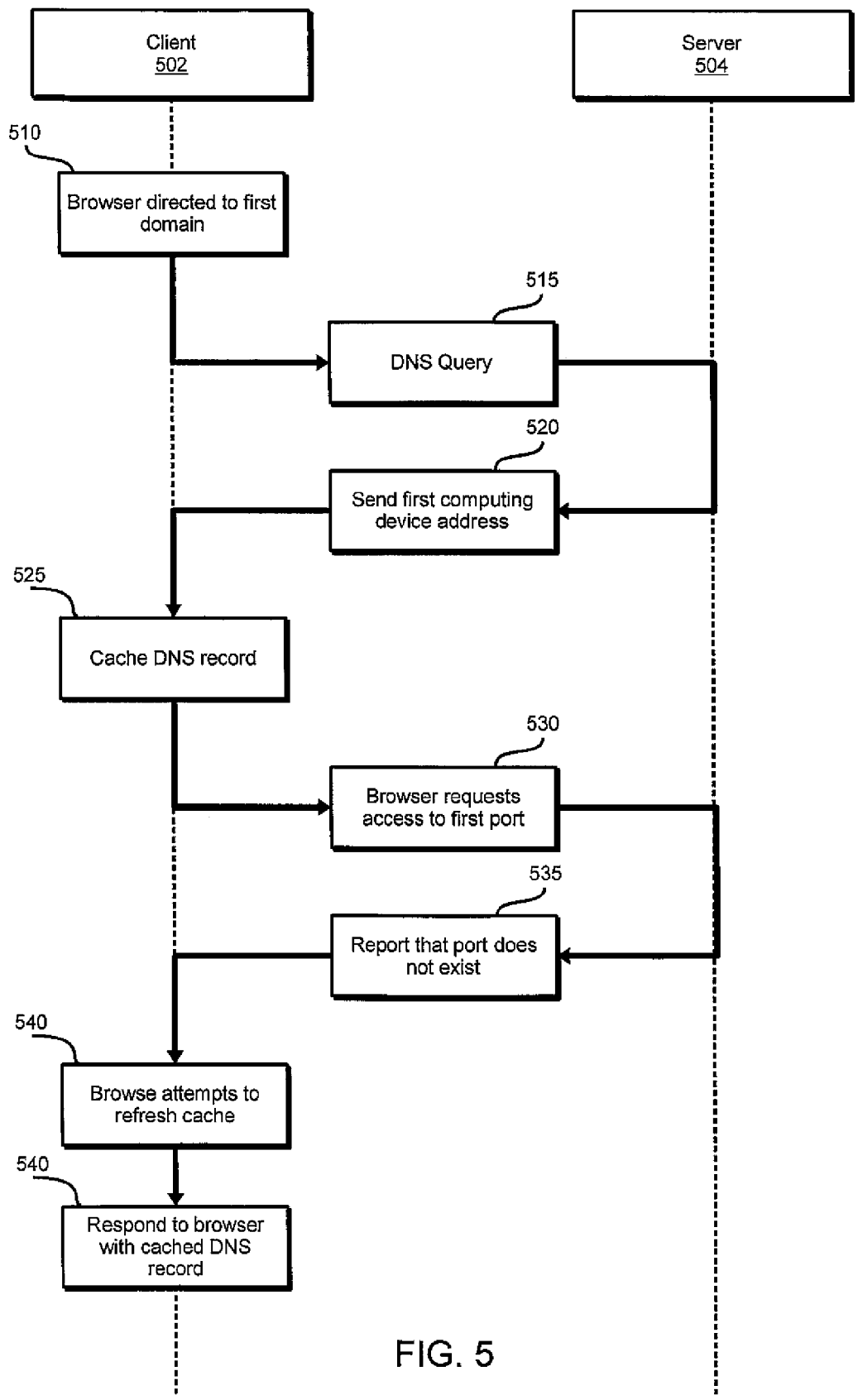
FIG. 5 is an exemplary block diagram showing communications between a client and a server according to embodiments of the instant disclosure.

FIG. 5 may illustrate communications between a client 502 and a server 504 in a network 500. Client 502 may include a browser. A user may direct the browser to a first domain (step 510). The browser may send a DNS query to a DNS server 504 (step 515). DNS server 504 may respond by sending a first computing-device address (step 520). Client 502 may receive the first computing-device address and then cache a DNS record (step 525). The DNS record may associate the first computing-device address with the first domain.

As previously mentioned, in a malicious attack the attacker may attempt to rebind the first domain to a different computing-device address by causing a request to be sent to a non-existing port. The browser may request access to a first port (step 530). Server 504 may report that the requested port does not exist (step 535). Then, the browser may attempt to refresh the cache (step 540), but the security module may provide the browser with the proxy DNS record (step 545) rather than allowing a query to be sent to an external (and potentially malicious) DNS server.

Figure 6:
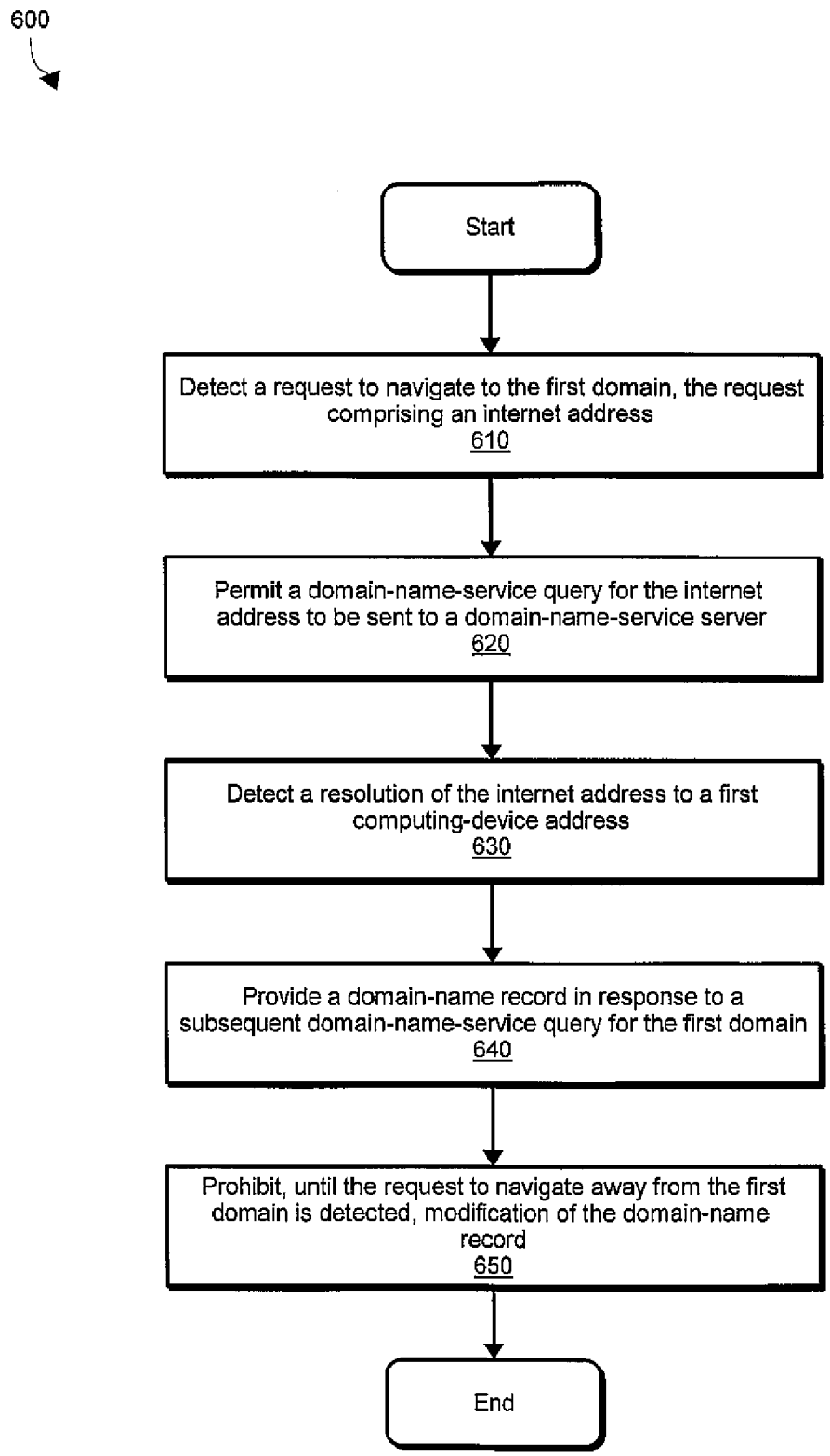
FIG. 6 is a flow diagram showing an exemplary method of addressing DNS rebinding according to certain embodiments.

FIG. 6 illustrates a method 600 for dealing with DNS rebinding. As shown, a security module may detect a request to navigate to a first domain (step 610). A request to navigate to a first domain may comprise a resource identifier. In some embodiments, a resource identifier may comprise an internet address. The request may comprise an internet address (e.g., www.maliciouswebsite.com). The internet address may be associated with the first domain.

The security module may permit the domain-name-service query for the internet address to be sent to a domain-name-server (step 620). The security module may detect a resolution of an internet address to a first computing-device address (step 630). Then, the security module may provide the domain-name record in response to a subsequent domain-name-server query for the first domain (step 640). Finally, the security module may prohibit, until the request to navigate away from the first domain is detected, modification of the domain-name record (step 650).

In some embodiments, modification of the domain-name record may comprise deleting the domain-name record, overriding the domain-name record, editing the domain-name record, or any other suitable process for modifying the domain-name record. According to various embodiments, detecting the request to navigate away from the first domain may comprise detecting a request to navigate to a second domain, comparing the first domain with the second domain, and/or determining that the first domain does not comprise the second domain.

In some embodiments, a request to navigate to the first domain comprises a first resource identifier (e.g., an internet address), and a request to navigate to the second domain comprises a second resource identifier (e.g., a second internet address). A request to navigate to the first domain may be a user entering an internet address in a browser and directing the browser to the domain. In such embodiments, comparing the first domain with the second domain may comprise comparing the first resource identifier with the second resource identifier.

Embodiments of the instant disclosure may provide more effective and/or robust protection against DNS rebinding attacks. For example, some embodiments may address one or more deficiencies of DNS pinning. Embodiments of the instant disclosure may also provide various other advantages and/or features.

Figure 7:
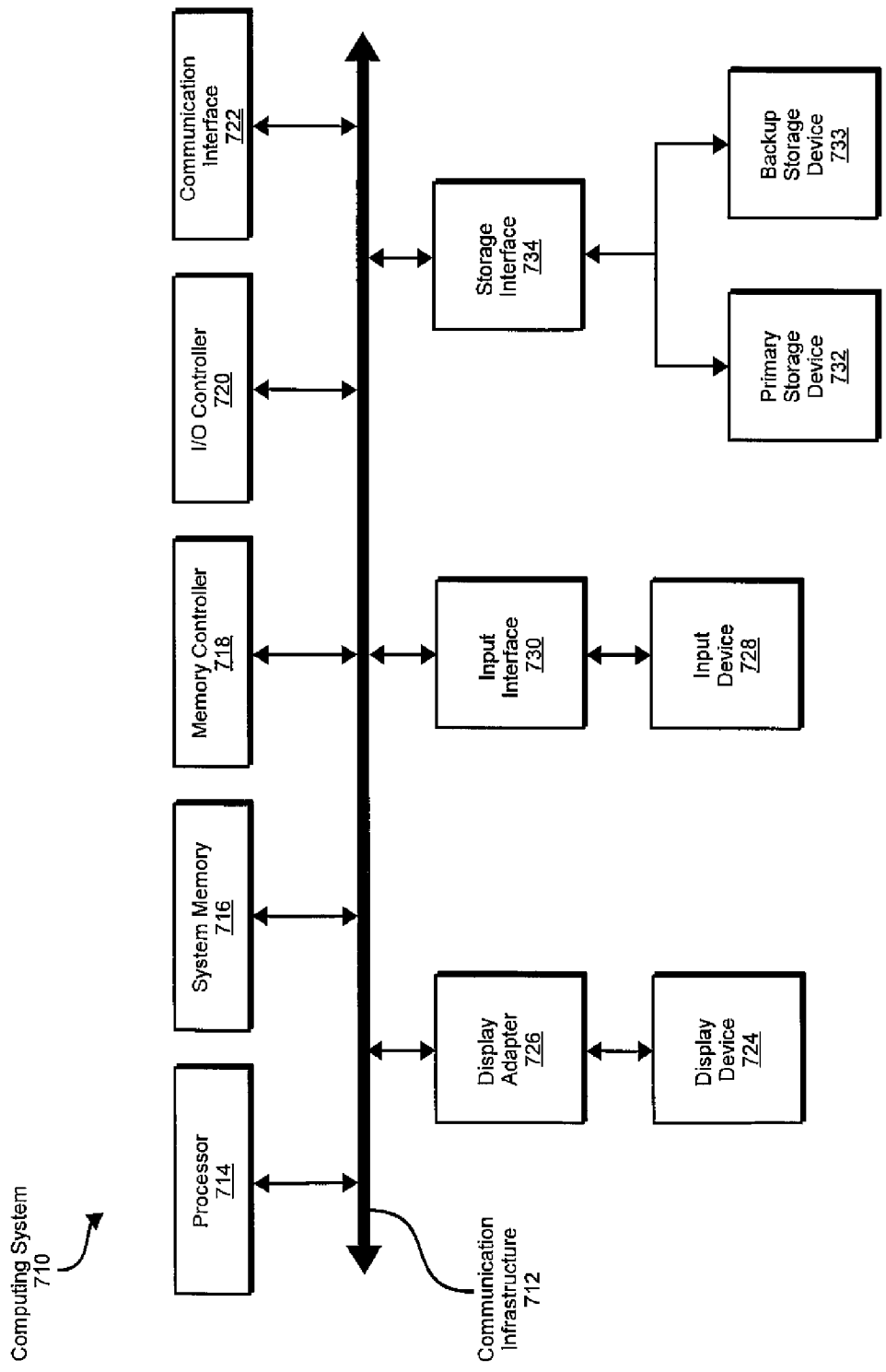
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the detecting, storing, using, preventing, permitting, overwriting, editing, determining, ignoring, and hooking steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing device 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as detecting, storing, using, preventing, permitting, overwriting, editing, determining, ignoring, and hooking.

I/O controller 720 generally represents any type or form of module capable of coordinating and/or controlling the input and output functions of a computing device. For example, in certain embodiments I/O controller may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the detecting, storing, using, preventing, permitting, overwriting, editing, determining, ignoring, and hooking steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the detecting, storing, using, preventing, permitting, overwriting, editing, determining, ignoring, and hooking steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the detecting, storing, using, preventing, permitting, overwriting, editing, determining, ignoring, and hooking steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, the exemplary file systems disclosed herein may be stored on primary storage device 732, while the exemplary file-system backups disclosed herein may be stored on backup storage device 733. Storage devices 732 and 733 may also be used, for example, to perform and/or be a means for performing, either alone or in combination with other elements, one or more of the detecting, storing, using, preventing, permitting, overwriting, editing, determining, ignoring, and hooking steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments descried and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
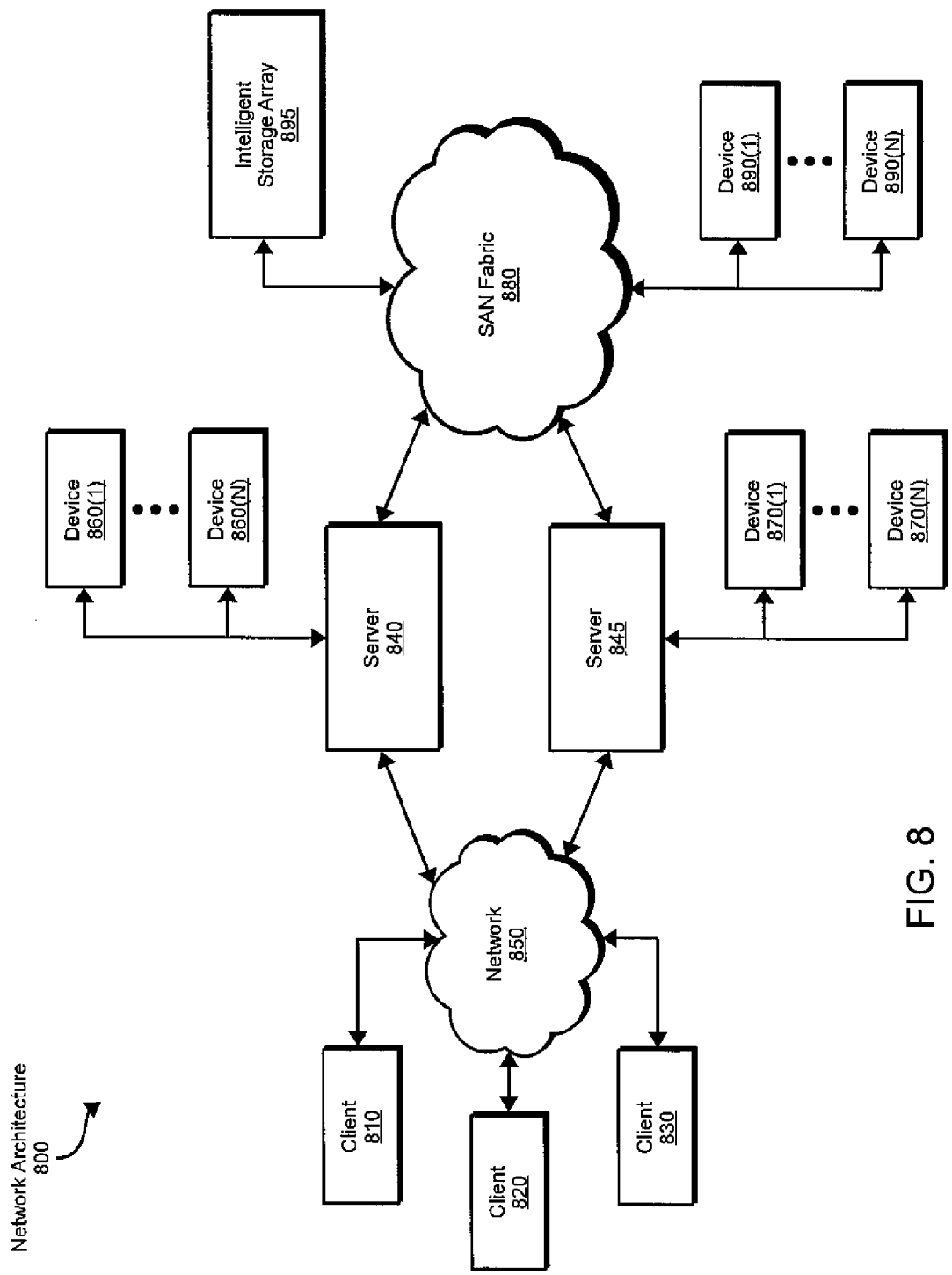
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 890(1)-(N) may be directly attached to server 845. Storage devices 860(1)-(N) and storage devices 890(1)-(N) generally represent any type or form of storage device or medium capable of storing data and/or other computer-readable instructions. In certain embodiments, storage devices 860(1)-(N) and storage devices 890(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 850, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the detecting, storing, using, preventing, permitting, overwriting, editing, determining, ignoring, and hooking steps disclosed herein. Network architecture 800 may also be used to perform and/or be a means for performing other steps and features set forth in the instant disclosure.

For example, in certain embodiments the exemplary file systems disclosed herein may be stored on client systems 810, 820, and/or 830. Similarly, the exemplary file-system backups disclosed herein may be stored on server 840, server 845, storage devices 860(1)-(N), storage devices 870(1)-(N), storage devices 890(1)-(N), intelligent storage array 895, or any combination thereof.

Computing system 710, network architecture 800, and/or the devices corresponding to computing system 710 and network architecture 800 may be programmed or otherwise configured to perform a method for address DNS rebinding. In various embodiments, a method may include detecting a resolution of an internet address to a first computing-device address, and the internet address may be associated with a first domain. The method may also comprise storing a domain-name record and the domain-name record may associate the internet address with the first computing-device address. In some embodiments, the method may include using the domain-name record to bind the first domain to the first computing-device address, and preventing, until a request to leave the first domain is detected, the first domain from being rebound to a second computing-device address. In some embodiments, preventing the first domain from being rebound to a second computing-device address may comprise ignoring a time-to-live value that the first domain provides for the domain-name record.

In various embodiments, preventing the first domain from being rebound to a second computing-device address may be performed by a browser plug-in. In some alternative embodiments, preventing the first domain from being rebound to a second computing-device may be performed by a domain-name-system proxy installed at a kernel level.

In some embodiments, the computer-implemented method may further comprise detecting the request to leave (e.g., navigate away from) the first domain. In various exemplary embodiments, detecting the request to leave the first domain may comprise detecting a request to navigate to a second domain, comparing the first domain with the second domain, and/or determining that the first domain does not comprise the second domain. In some embodiments, a request to navigate to the first domain may comprise a first resource identifier (e.g., a URL or URI), the request to navigate the second domain may comprise a second resource identifier (e.g., a URL or URI), and comparing the first domain with the second domain may comprise comparing the first resource identifier with the second resource identifier.

In various embodiments, the computer-implemented method may further comprise receiving a request to access a non-existing port at the first domain, and preventing the domain-name record from being modified in response to the request to access the non-existing port. The method may also further comprise hooking a domain-name-system query application-programming interface.

In certain embodiments, using the domain-name-record to bind the first domain to the first computing-device address may comprise providing the domain-name record in response to a subsequent domain-name-service query for the first domain. In some embodiments, preventing the first domain from being rebound may comprise prohibiting, until the request to navigate away from the first domain is detected, modification of the domain-name record. In various embodiments, modification of the domain-name record may comprise deleting the domain-name record, overwriting the domain-name record, and/or editing the domain-name record.

In various embodiments, the computer-implemented method may include detecting a request to navigate to the first domain. The request may comprise the internet address. In certain embodiments the method may include permitting a domain-name-service query for the internet address to be sent to a domain-name-service server.

In at least one embodiment a system may comprise a browser plug-in for a network browser. The browser plug-in may comprise a detection module configured to detect a resolution of an internet address to a first computing-device address. The internet address may be associated with a first domain. The system may also comprise a domain-name record cache configured to store a domain-name record, and the domain-name record may associate the internet address with the first computing-device address. The system may comprise a domain-name-system response module configured to use the domain-name record to bind the first domain to the first computing-device address by providing the domain-name record in response to a domain-name-service query for the first domain, and a security module configured to prevent, until the browser navigates away from the first domain, the first domain from being rebound to a second computing-device address. In at least one embodiment, the system may further comprise a reporting module configured to report an attempt to rebind the first domain to the second computing-device address.

In some embodiments, the browser plug-in may comprise a browser-helper object, and in various embodiments the security module may be configured to clear the cache after the browser navigates away from or otherwise leaves the first domain. In some embodiments, a system may comprise a domain-name-system proxy. The domain-name-system proxy may comprise a detection module configured to detect a resolution of an internet address to a first computing-device address and the internet address may be associated with a first domain. The domain-name-system proxy may also comprise a domain-name record cache configured to store a domain-name record and the domain-name record may associate the internet address with the first computing-device address.

The system may also comprise a domain-name-system response module configured to use the domain-name record to bind the first domain to the first computing-device address by providing the domain-name record in response to a domain-name-service query for the first domain, and a security module configured to prevent, until a request to leave the first domain is detected, the first domain from being rebound to a second computing-device address.

In various embodiments, the domain-name-system proxy may comprise the domain-name-system response module and the security module. In some embodiments a browser plug-in may comprise the domain-name-system response module and the security module. In at least one embodiment the browser plug-in may be configured to communicate with the domain-name-system proxy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

We claim:

1. A computer-implemented method comprising:
   detecting a resolution of an internet address to a first computing-device address, the internet address being associated with a first domain;
   storing a domain-name record, the domain-name record associating the internet address with the first computing-device address;
   using the domain-name record to bind the first domain to the first computing-device address;
   preventing, until a request to leave the first domain is detected, the first domain from being rebound to a second computing-device address; wherein: using the domain-name record to bind the first domain to the first computing-device address comprises providing the domain-name record in response to a subsequent domain-name-service query for the first domain; preventing the first domain from being rebound comprises: prohibiting, until the request to leave the first domain is detected, modification of the domain-name record; the request to leave the first domain comprises at least one of: a request to navigate to a second domain; a request to terminate a browser window; a request to terminate a browser tab.

2. The computer-implemented method of claim 1, further comprising:
   detecting a request to navigate to the first domain, the request comprising the internet address;
   permitting a domain-name-service query for the internet address to be sent to a domain-name-service server.

3. The computer-implemented method of claim 1, wherein modification of the domain-name record comprises at least one of:
   deleting the domain-name record;
   overwriting the domain-name record;
   editing the domain-name record.

4. The computer-implemented method of claim 1, further comprising detecting the request to leave the first domain.

5. The computer-implemented method of claim 1, wherein detecting the request to leave the first domain comprises:
   detecting a request to navigate to a second domain;
   comparing the first domain with the second domain;
   determining that the first domain does not comprise the second domain.

6. The computer-implemented method of claim 5, wherein:
   a request to navigate to the first domain comprises a first uniform resource locator;
   the request to navigate to the second domain comprises a second uniform resource locator;
   comparing the first domain with the second domain comprises comparing the first uniform resource locator with the second uniform resource locator.

7. The computer-implemented method of claim 1, wherein preventing the first domain from being rebound to a second computing-device address is performed by a browser plug-in.

8. The computer-implemented method of claim 1, wherein preventing the first domain from being rebound to a second computing-device is performed by a domain-name-system proxy installed at a kernel level.

9. The computer-implemented method of claim 1, further comprising:
   receiving a request to access a non-existing port at the first domain;
   preventing the domain-name record from being modified in response to the request to access the non-existing port.

10. The computer-implemented method of claim 1, wherein preventing the first domain from being rebound to a second computing-device address comprises ignoring a time-to-live value for the domain-name record.

11. The method of claim 1, further comprising: hooking a domain-name-system query application-programming interface.

12. A system comprising:
    a browser plug-in for a network browser, the browser plug-in comprising:
       a detection module configured to detect a resolution of an internet address to a first computing-device address, the internet address being associated with a first domain;
       a domain-name record cache configured to store a domain-name record, the domain-name record associating the internet address with the first computing-device address;
       a domain-name-system response module configured to use the domain-name record to bind the first domain to the first computing-device address by providing the domain-name record in response to a domain-name-service query for the first domain;
       a security module configured to prevent, until the browser leaves the first domain, the first domain from being rebound to a second computing-device address;
    at least one processor configured to execute the browser plug-in; wherein the browser plug-in comprises a browser-helper object; the Internet address comprises at least one of a uniform resource identifier and a uniform resource locator; and the first computing-device address comprises an internet protocol address.

13. The system of claim 12, wherein the security module is configured to clear the cache after the browser leaves the first domain.

14. The system of claim 12, further comprising a reporting module configured to report an attempt to rebind the first domain to the second computing-device address.

15. A system comprising:
    a domain-name-system proxy installed at a kernel level, the domain-name-system proxy comprising:
       a detection module configured to detect a resolution of an internet address to a first computing-device address, the internet address being associated with a first domain;
       a domain-name record cache configured to store a domain-name record, the domain-name record associating the internet address with the first computing-device address;
    a domain-name-system response module configured to use the domain-name record to bind the first domain to the first computing-device address by providing the domain-name record in response to a domain-name-service query for the first domain;
    a security module configured to prevent, until a request to leave the first domain is detected, the first domain from being rebound to a second computing-device address;

at least one processor configured to execute the domain-name-system proxy; wherein a browser plug-in comprises the domain-name-system response module and the security module; and wherein the browser plug-in is configured to communicate with the domain-name-system proxy.

16. The system of claim 15, wherein the domain-name-system proxy comprises the domain-name-system response module and the security module.

* * * * *